United States Patent Office 3,152,326
Patented Oct. 6, 1964

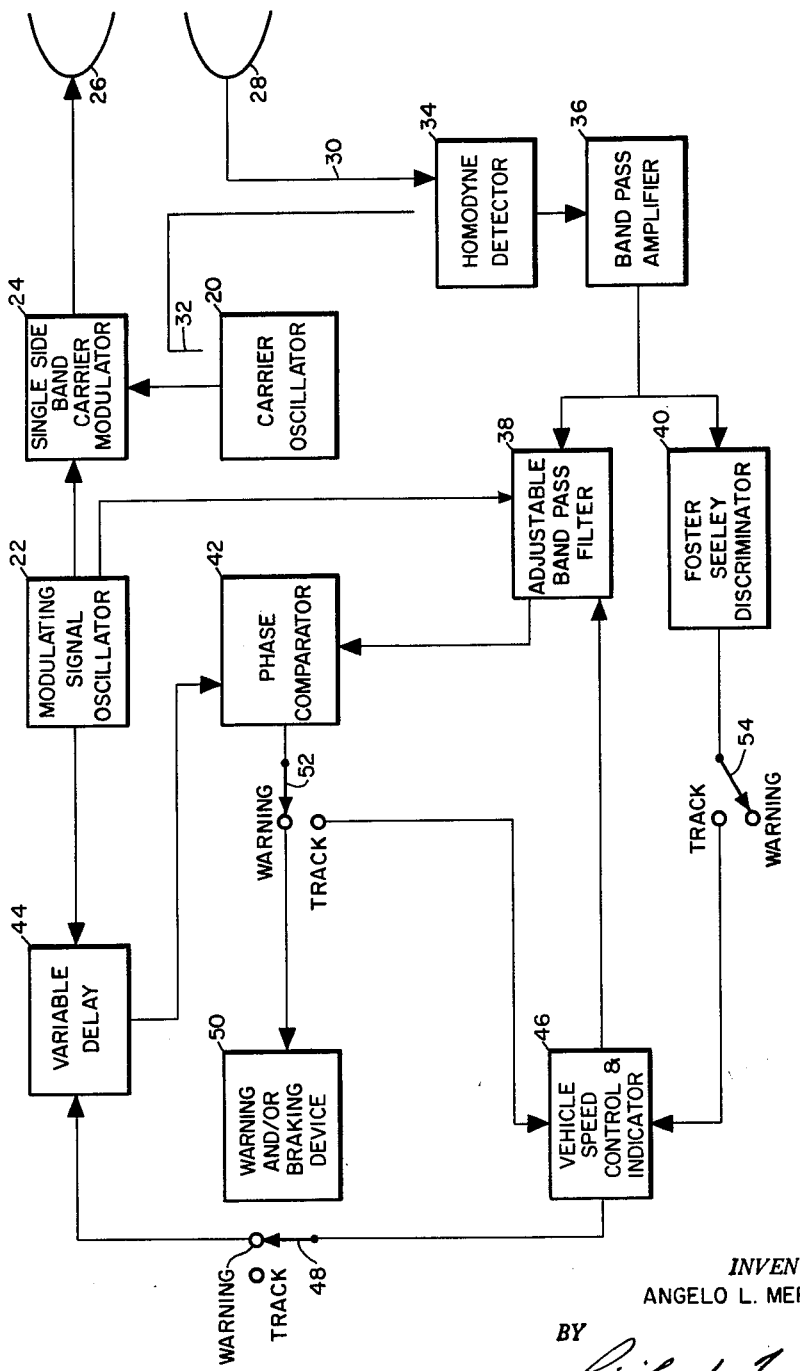

3,152,326
VEHICLE RADAR SYSTEM
Angelo L. Merlo, Troy, Mich., assignor to The Bendix Corporation, a corporation of Delaware
Filed Oct. 2, 1959, Ser. No. 844,037
16 Claims. (Cl. 343—7)

This invention pertains to a vehicle radar system and, more particularly, to a radar system for developing a signal for warning or braking when a first vehicle has reached a distance proportional to the vehicle's speed behind a second vehicle or obstacle, and to a system which provides means for tracking, i.e., maintaining a first vehicle a predetermined distance behind a second vehicle.

It is an object of this invention to provide a vehicle radar system wherein a signal for warning or braking is developed comprising means for transmitting a high frequency single side band signal from a transmitter to a second vehicle or object, means for receiving the reflection of the transmitted signal, means for delaying a second signal from the high frequency transmitter in proportion to vehicle speed and comparing the phase of the reflected and delayed signals, with any phase difference causing a corresponding voltage to be sent to a vehicle speed control until the phases are in a predetermined agreement.

It is another object of this invention to provide a vehicle radar system for producing a signal for warning or braking the vehicle by single side band amplitude modulating a high frequency signal, means for transmitting the modulated signal from a transmitter to a second vehicle or object, means for receiving the reflections of the transmitted signal, means for homodyne detecting of the reflected signal to obtain the reflected modulating frequency which has been shifted in phase, means for filtering the reflected signal to remove reflected signals having frequency components due to opening separation between the vehicle and object, means for phase delaying a second transmitted modulating frequency in accordance with vehicle speed and phase comparing the delayed modulated frequency with the detected reflected frequency to establish a voltage corresponding to any phase difference for warning or braking the first vehicle.

It is a further object of this invention to provide a vehicle radar system for automatically maintaining a first vehicle a distance behind a second vehicle by providing means for single side band amplitude modulating a high frequency carrier signal, means for transmitting the modulated signal to the second vehicle, means for receiving the signal reflected from the second vehicle, means for homodyne detecting of the reflected signal to obtain the modulator signal, means for comparing the frequency difference between the reflected signal and the transmitted modulator signal and emitting a voltage corresponding to such frequency difference which controls the vehicle's speed so as to tend to minimize such difference.

It is another object to provide in the system of the last mentioned object means for maintaining a first vehicle a predetermined distance behind the second vehicle by providing means for a delaying a second signal derived from the modulator to correspond with the distance between the two vehicles, and means for phase comparing the reflected signal with the delayed signal and for emitting a voltage proportional to such phase difference which is sent to a vehicle speed control for modifying the speed of the first vehicle in a manner to minimize such phase difference.

These and other objects will become more apparent when a preferred embodiment is considered in connection with the drawing which shows a block diagram with means for providing a signal for warning or braking a first vehicle when it approaches a second vehicle or object, which distance is proportional to the speed of the first vehicle and, alternatively, means for maintaining the first vehicle a predetermined distance from a second vehicle.

In the drawing is shown a radio frequency oscillator 20 for generating a high frequency carrier signal. Modulating signal oscillator 22 generates a signal with a constant frequency which is selected so that it can be unambiguously phase compared in normal vehicle application to determine vehicle distance from an object as later explained. The wavelength of the modulating signal is preferably more than twice the maximum distance for which the system is designed. The modulating frequency in this embodiment is 150 kilocycles and is selected to avoid noise produced by the mixer and has a sufficiently long wavelength. A single side band amplitude modulator 24 which may be a magic T modulates the signal from radio frequency oscillator 20 with the signal from modulator oscillator 22 and is connected to a transmitting antenna which may be fastened to a vehicle grill or other suitable vehicle portion and directed toward the intended vehicle path.

A receiving antenna 28 is provided, preferably in concentric relation with antenna 26, and is connected to a coupler 30. Also connected to coupler 30 by means of a coupler 32 is a signal from oscillator 20 and the output of coupler 30, which is the sum of the carrier signal and a reflected signal, is passed to a homodyne detector 34 where the carrier portion of the reflected signal is removed. The output of the detector, which contains the modulated signal plus or minus any Doppler frequency which is caused by any relative velocity difference between the first vehicle and a second vehicle or object, is connected to a band pass amplifier 36 which is designed to pass a wide band of frequencies extending from just below the modulator frequency to the modulator frequency plus the maximum desired change in frequency due to velocity difference between the first vehicle and an object.

The amplified signal from amplifier 36 is then sent to adjustable band pass filter 38 and a Foster-Seeley frequency discriminator 40. A phase comparator 42 receives signals from band pass filter 38 and a variable delay 44 which receives a modulator signal from oscillator 22 and then delays this signal either according to a manual setting in the case when the system is used to track a second vehicle or automatically corresponding to the vehicle's speed, which is received from a vehicle speed control and indicator 46, when switch 48 is in the warning position as shown. Phase comparator 42 compares the signal from variable delay 44 and from filter 38 and then produces a voltage, corresponding to any phase differences for actuating a warning and/or braking device 50 when switch 52 is in the upper or warning position as shown and energizing accelerator and brake control 46 when switch 52 is in lower position.

Since a single side band signal is utilized in this system, the frequencies received by antenna 28 corresponding to opening distances between vehicles are separate from the frequencies corresponding to closing distances between vehicles. The opening frequencies can then be rejected by proper adjustment of band pass filter 38. This is desirable since there is no danger when vehicles are moving away from one another and this prevents warning or braking during such condition. Also, when vehicles approach each other, as they would in opposite moving adjacent lanes, the closing frequency is very high and the band passed by filter 38 can be adjusted to exclude these frequencies if desired. This would be advantageous if the antennas used tend to pick up signals of vehicles in an adjacent lane. By connecting control 46 to filter 38, as shown, the high end of the frequency band that is passed can be varied according to the vehicle speed. Preferably, the maximum frequency passed is never greater than the closing Doppler frequency that corresponds to the vehicle approaching a stationary object, plus any desired increment. This automatically excludes closing Doppler frequencies due to approaching vehicles at any vehicle speed.

When the system is operating on track mode, it is desirable only to pass a band of frequencies which are closely adjacent to the modulating signal frequency since in this mode of operation it is desired to maintain a constant distance behind a second vehicle and the opening and closing Doppler frequencies would be at a minimum. Therefore, filter 38 would pass one band of frequencies for the warning mode operation and a second, narrower band of frequencies for the track mode operation. When the system is set for warning or track mode operation, this selection is automatically made.

Operation

In the operation of this embodiment a carrier frequency from oscillator 20 is single side band amplitude modulated by a modulator 24 which receives a modulating signal from oscillator 22. The amplitude modulated signal is set to transmitting antenna 26, which is directed towards and along the vehicle path. Reflections from a second vehicle or obstacle in the path are received by antenna 28 and sent to homodyne detector 34 where the carrier frequency is removed. The output of detector 34 passes through amplifier 36 where a desired range of frequencies is broadly selected and amplified and sent to filter 38 and discriminator 40.

Warning and Braking Mode

Switches 48, 52 and 54, may be simultaneously moved by the vehicle operator to the warning positions, and at the same time, the band of frequencies passed by filter 38 indicate only dangerous closing situations. The signal from filter 38 is sent to a phase comparator 42. Also sent to phase comparator 42 is a modulator signal from oscillator 22 which has been delayed by delay 44 by an amount corresponding to the vehicle speed with the greater the vehicle speed the greater the delay. This delay corresponds to a desired distance between the first and second vehicles for a given speed of the first vehicle and if it is not in agreement with comparator 42, a signal will be sent to warning and/or braking device 50 to slow and/or warn the vehicle operator that the distance between himself and the obstacle in his path is too small. The comparator 42 is designed so that it will not emit a signal for distances that are too large thus providing a range cut off to prevent distant objects picked up when traveling curves or hills from actuating the system. The variable delay is automatically changed by a signal developed by control 46 which is proportional to vehicle speed.

Tracking Mode

For this mode switches 48, 52 and 54 are switched to track, and the frequency band that filter 38 passes is narrowed and centered on the modulating signal. Under these conditions the vehicle will stay a predetermined distance behind a second vehicle. As before, a single side band modulated signal is transmitted from antenna 26 and the reflections are received by antenna 28 where they are added with a carrier frequency from oscillator 20 and detected by detector 34 and passed and amplified by amplifier 36 and then sent to filter 38 and discriminator 40. Discriminator 40 is centered on the modulating signal frequency developed by oscillator 22 and for any frequency difference on either side of the modulator frequency a corresponding signal will be sent through closed switch 54 to accelerator and brake control 46. Since a single side band system is used, there will be only one signal for increased frequency due to a closing movement between the two vehicles and a different single signal for a decreased frequency indicating an opening movement between the vehicles. For example, in the case of an opening movement a corresponding plus voltage would be sent to accelerator and brake control 46 to increase the vehicle speed until the reflected frequency received is equal to the modulator frequency; for a closing vehicle movement a negative voltage will be sent to control 46 to decelerate the first vehicle until the reflected frequency agrees with the modulated frequency.

The discriminator 40 maintains the first vehicle a constant distance behind the second vehicle but it does not control the amount of distance between the vehicles. To accomplish this, a manual setting is made on the variable delay 44 which corresponds to the desired distance between vehicles. The delay signal from delay 44 is then sent to phase comparator 42 where it is compared with the phase of the reflected signal and comparator 42 will emit a voltage corresponding to any phase difference to control 46 through switch 52 which is now in its lower position. This voltage overrides the voltage produced by the discriminator 40 until proper separation is achieved at which time the discriminator will maintain the desired distance.

A device of this invention may be placed rearwardly of the vehicle to give exterior and/or interior warning of vehicles which are too close to the vehicle rear.

If desired, in the track mode, switch 48 can remain in the warning position so that the distance between the two tracking vehicles will vary in accordance with the vehicle speed, with a greater distance being between vehicles for higher vehicle speed. Also, the modulating oscillator 22 is connected to filter 38 in order to supply a modulating signal frequency reference.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described my invention, I claim:

1. A vehicle radar system for signifying closing movements between a vehicle and an object in the path of said vehicle comprising means for transmitting a high frequency single side band signal, means for receiving the reflections of said signal, filter means for rejecting the frequency components of the reflected signal due to opening movements, means for delaying the transmitted signal in accordance with vehicle speed, means for comparing the phase of at least portions of the output of said last means with the phase of at least portions of the reflected signal, and emitting a signal when the phase difference is greater than a predetermined minimum.

2. The vehicle radar system of claim 1 wherein said high frequency signal is single side band amplitude modulated.

3. The vehicle radar system of claim 2 wherein said single side band high frequency signal comprises a high frequency carrier signal and a lower frequency modulating signal, said modulating signal being chosen so that its wavelength will be at least twice as long as the maximum warning distance desired.

4. The vehicle radar system of claim 1 wherein said comparing means is adjustable to provide a variable range cut off.

5. The vehicle radar system of claim 1 wherein said signal is connected to a warning device.

6. The vehicle radar system of claim 1 wherein said signal actuates a braking device.

7. A vehicle radar system comprising means for generating a modulating signal, means for single side band modulating a high frequency carrier and transmitting the modulated carrier signal, means for receiving the reflections of said transmitted signal, means for homodyne detecting said reflected signal to remove the carrier, means for sensing the frequency differences of said detected signal from said modulating signal and converting these differences to a corresponding voltage to adjust vehicle velocity, means connected to the modulating signal generating means for delaying the phase of the modulating signal, means connectable with said last means for varying the phase delay according to vehicle speed, means for comparing phase of the delayed modulating frequency with the phase of the reflected detected signal, means for adjusting vehicle velocity corresponding to the phase difference between said delayed signal and said detected signal, means for emitting at least one of a warning signal and a vehicle control signal corresponding to said phase difference, switching means for connecting said phase difference to said emitting means, and connecting said variable phase delay to said means for varying phase delay according to vehicle speed, a vehicle velocity control switching means to connect said phase difference to said vehicle velocity control and said frequency difference to said vehicle velocity control for maintaining said vehicle a predetermined distance from a second vehicle.

8. The vehicle radar system of claim 7 having filter means for discriminating against opening Doppler signals connected between said detector and said phase comparing means.

9. The vehicle radar system of claim 8 with said vehicle velocity control means being connected to said filter means to adjust the band gap of said filter means in accordance with vehicle speed so that closing Doppler signals corresponding to speeds greater than vehicle speed will not be passed.

10. A vehicle radar system for signifying closing movements between a vehicle and an object in the path of the path of said vehicle comprising means for transmitting a high frequency single side band signal, means for receiving the reflections of said signal, filter means for rejecting the frequency components of the reflected signal due to opening movements, means for delaying the transmitted signal in a predetermined manner, means for comparing the phase of at least portions of the output of said last means with the phase of at least portions of the reflected signal, and emitting a signal when the phase difference is greater than a predetermined value.

11. The vehicle radar system of claim 10 having means for adjusting said last means according to vehicle speed to limit the high side of the band of frequencies passed so that signals reflected from vehicles traveling in the opposite direction will be rejected.

12. The vehicle radar system of claim 10 with said last means being adjusted to limit the high side of the band of frequencies passed so that signals reflected from vehicles traveling in the opposite direction will be rejected.

13. The vehicle radar system of claim 12 having means for passing to said comparing means only those frequencies adjacent said transmitted frequency and emitting a signal corresponding to the difference with said transmitting signal.

14. The vehicle radar system of claim 12 wherein said single side band high frequency signal comprises a high frequency carrier signal and a lower frequency modulating signal, said modulating signal being chosen so that its wavelength will be at least twice as long as the maximum warning distance desired.

15. A vehicular radar system for signifying closing movement between a vehicle and an object in the path of said vehicle comprising means for transmitting a single side band high frequency signal, means for receiving the reflections of said signal, means for discriminating between opening and closing Doppler frequencies in the reflections of said single side band signal, means for emitting an electrical signal when there is a closing Doppler signal.

16. A vehicle radar system comprising means for transmitting a single side band high frequency signal, means for receiving the reflections of said signal, means for sensing the frequency differences from said high frequency signal and converting these differences to a corresponding voltage to adjust vehicle velocity, having means for delaying the phase of the modulating frequency by a given amount, means for comparing the phase of this delayed modulating frequency with the phase of at least portions of the reflected signal, means for adjusting vehicle velocity corresponding to phase difference between said delay signal and said reflected signal, filter means for passing to said comparing means only those frequencies reflected from a closing object.

References Cited in the file of this patent
UNITED STATES PATENTS

| 2,147,810 | Alford | Feb. 21, 1939 |
| 2,236,893 | Chaffee | Apr. 1, 1941 |
| 2,695,995 | Cauchois | Nov. 30, 1954 |
| 2,804,160 | Rashid | Aug. 27, 1957 |